United States Patent [19]

Bjornholt

[11] Patent Number: 4,479,227
[45] Date of Patent: Oct. 23, 1984

[54] AUTO-BALANCE METHOD AND APPARATUS FOR SUPPRESSION OF RESIDUAL LINES IN A TRANSMITTED SPECTRUM

[75] Inventor: John E. Bjornholt, Mesa, Ariz.

[73] Assignee: Motorola Inc., Schaumburg, Ill.

[21] Appl. No.: 414,186

[22] Filed: Sep. 2, 1982

[51] Int. Cl.³ .............................................. H04K 1/00
[52] U.S. Cl. ........................................ 375/1; 370/107
[58] Field of Search ................. 375/1, 2, 115; 455/26; 178/22.12, 22.13, 22.14; 370/107; 343/5 PN

[56] References Cited

U.S. PATENT DOCUMENTS

| | | | |
|---|---|---|---|
| 3,562,420 | 2/1971 | Thompson | 375/1 |
| 3,878,527 | 4/1975 | Rensin et al. | 375/1 |
| 4,017,798 | 4/1977 | Gordy et al. | 375/1 |
| 4,279,018 | 7/1981 | Carson | 375/1 |

Primary Examiner—Robert L. Griffin
Assistant Examiner—Stephen Chin
Attorney, Agent, or Firm—Eugene A. Parsons

[57] ABSTRACT

An automatic residual line suppression system for use with a spread spectrum signal wherein a narrow-band sample of the signal around a selected frequency is multiplied by a dithered signal in an auto-balance control loop. A resulting signal is used to control the dc offset of a mixer in order to minimize the residual carrier line in the signal spectrum while any remaining detectible residual lines are smeared by a noise source during up-conversion.

14 Claims, 4 Drawing Figures

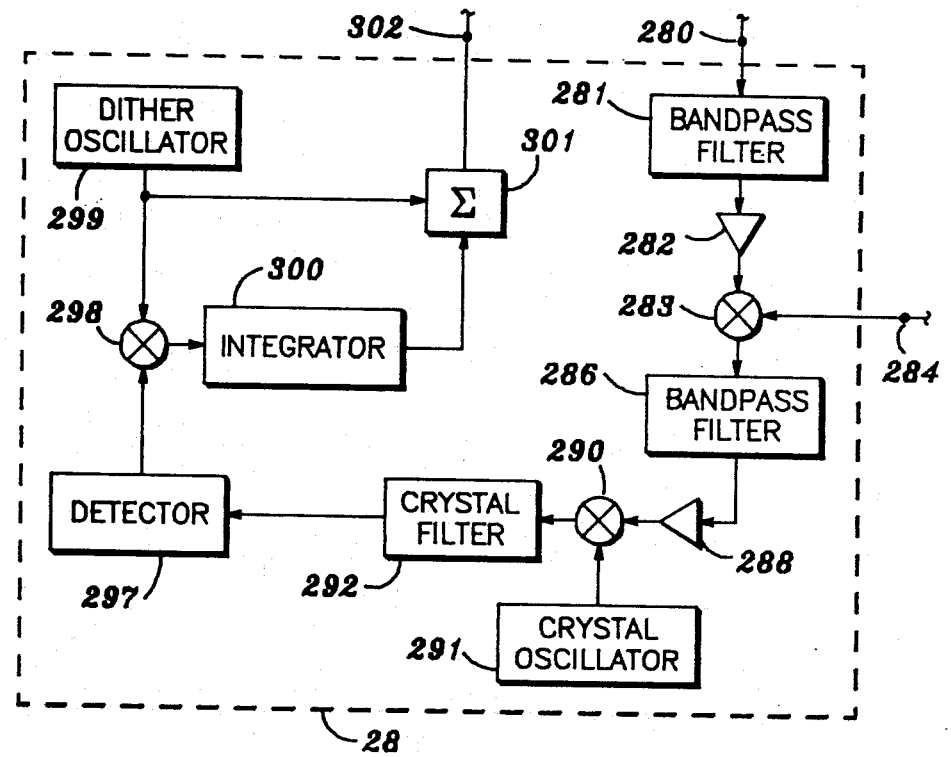
Fig. 2
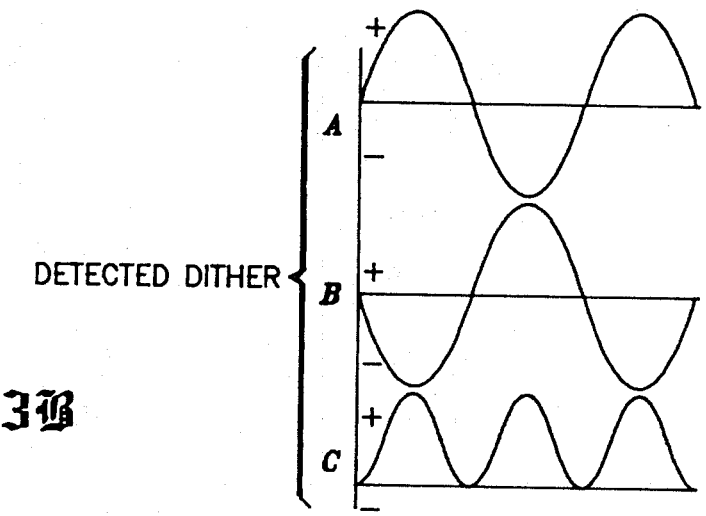
DETECTED DITHER
Fig. 3B
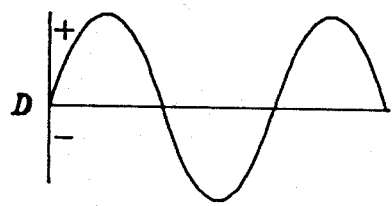
SIGNAL AT OUTPUT OF OSCILLATOR 299

AUTO-BALANCE METHOD AND APPARATUS FOR SUPPRESSION OF RESIDUAL LINES IN A TRANSMITTED SPECTRUM

BACKGROUND OF THE INVENTION

The present invention relates to methods and apparatus for enhancing the covertness of a spread spectrum transmission and in particular to auto-balance methods and apparatus for suppression of residual lines in a signal spectrum.

In certain covert communication systems it is desirable to spread a signal into a wide band that looks like noise. Such spreading can be accomplished by the use of a bi-phase modulator which splits a carrier signal into segments and alters the phase of each segment in response to a binary signal received from a pseudo-random bit sequence code generator. The response to the bit sequence is such that a logic zero level bit allows an in-phase carrier signal and the logic 1 level bit changes the phase of the carrier signal by 180°. The greater the frequency with which bits are supplied by the binary code generator, called the code clock frequency, the greater is the spreading of signal frequency that results.

Where covertness is the primary objective of an RF link, the practical limit on the obtainable covertness of a transmitter is determined by the degree of suppression of residual lines in the transmitted spectrum. Residual lines are caused by continuous signals, such as the carrier and the carrier±the code clock frequencies. These lines are, in general, more detectible by narrow band spectrum analysis techniques than are the transitory lines in the spectrum associated with the spreading process as long as an adequately designed spreading function is employed.

If all the balances in the transmitter are carefully made, including the balance in the spreading modulator, the balance of rise and fall shapes and times in the spreading function (code) and the balance of the one and zero energy of the spreading function, then the residual lines are probably suppressed to a level that provides the desired covertness. Nevertheless, although those balances associated with the design of the spreading function can be relied upon to remain as designed, those adjustments associated with modulator balance are subject to drift and change due to temperature, time and other factors. At microwave frequencies, when the proper adjustments are made, the most critical spectrum line, the suppressed carrier, can easily be suppressed below the unmodulated carrier by at least 20 db and can with a great deal of care and design difficulty (e.g., by employing temperature control) be held to 40 db below the unmodulated carrier.

Because of the difficulty associated with providing the appropriate transmitter balances, one approach to the problem of residual lines involves nulling the residual carrier component by employing phase and amplitude tracking circuits. However, such circuits are costly and complex so that the implementation, the fabrication and the testing of such circuits is difficult. Furthermore, such carrier nulling does not operate on residual continuous wave spectral components other than the carrier.

Therefore, it is desirable to have a simple means for enhancing the covertness of a spread spectrum transmission in order to make detection by undesirable or unintentional receivers difficult, if not impossible.

SUMMARY OF THE INVENTION

Accordingly, it is an object of the present invention to provide a new and improved auto-balance apparatus for suppression of the residual carrier line in a signal spectrum.

It is a further object of the present invention to provide a new and improved method for providing an auto-balance for suppression of the residual carrier line in a signal spectrum.

Another object of the present invention is to provide a new and improved transmitter capable of suppressing all residual lines in a signal spectrum.

Among the advantages of the present invention is the simplicity of implementation that makes fabrication and testing easier.

Another advantage of the present invention is an improved performance over phase and amplitude tracking circuits which null only the carrier.

In order to attain the above-mentioned and other objects and advantages the apparatus of the present invention involves an auto-balance apparatus for suppression of a residual carrier line in a signal spectrum around a carrier frequency. The auto-balance apparatus comprises means for obtaining a narrow-band frequency sample of the signal spectrum around the carrier frequency and a source of a dither signal, both of which are coupled to a multiplier. A summing device is also coupled to the source of a dither signal and an integrator is coupled between the multiplier and the summing device.

The method of the present invention involves providing an auto-balance for suppression of a residual carrier line in a mixer providing a spread spectrum signal around the frequency of the carrier. The auto-balance method comprises the steps of obtaining a narrow-band frequency sample of the signal spectrum around the frequency of the carrier, multiplying the narrow-band frequency sample by a dithered signal, and integrating a result of the multiplying step. A result of the integrating step is summed with the dithered signal and a result of the summing is used to vary a dc offset of the mixer in order to minimize the carrier frequency component in the spread spectrum signal.

A transmitter according to the present invention involves apparatus capable of suppressing the residual carrier line in a signal spectrum and comprises an encoder coupled to a modulator. An auto-balance apparatus and a summing device are coupled to each other and to the modulator. A code generator is coupled to the summing device. An up-converter is coupled to a noise source, to a modulator and to an antenna.

BRIEF DESCRIPTION OF THE DRAWINGS

FIG. 2 is a block diagram of an auto-balance apparatus according to the present invention;

FIG. 3B is a set of representative waveforms for the conditions in FIG. 3A.

DESCRIPTION OF THE PREFERRED EMBODIMENT

Figure 1:
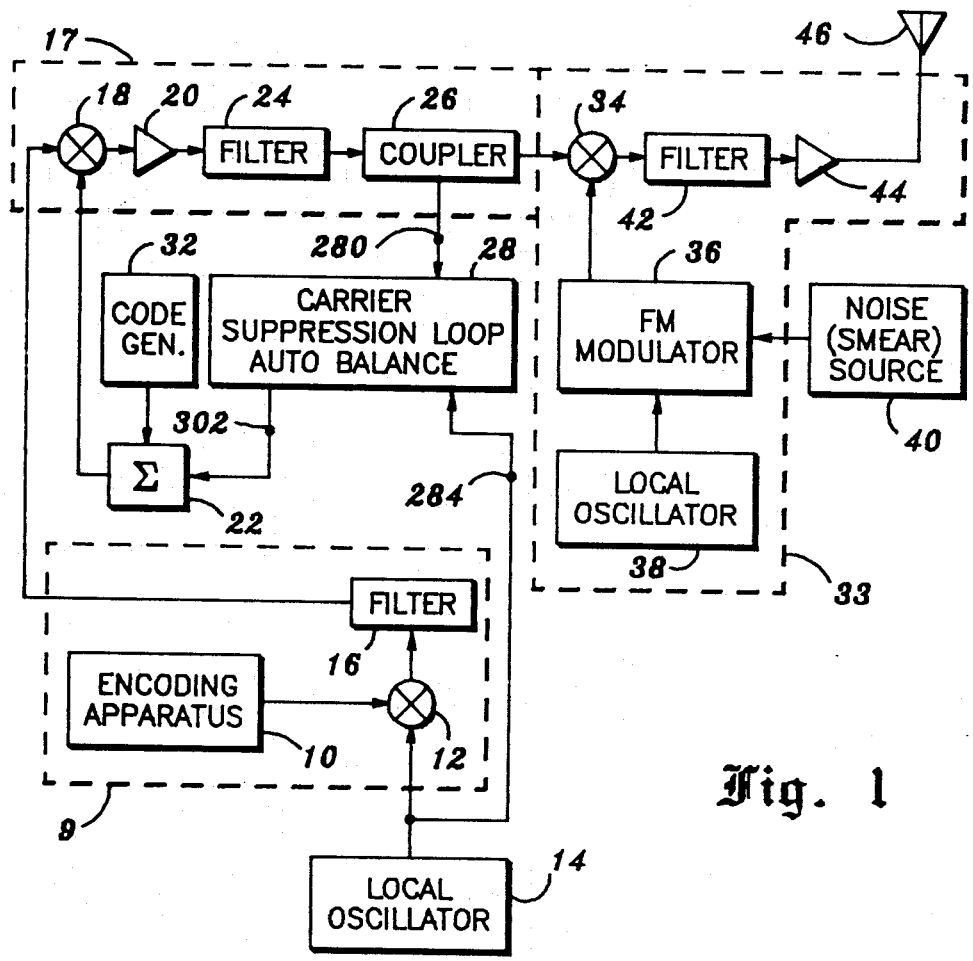
FIG. 1 is a block diagram of a transmitter according to the present invention.

In a preferred embodiment of the transmitter according to the present invention as illustrated in FIG. 1, an encoder 9 comprises a encoding apparatus 10 connected to a mixer 12 which is in turn connected to a filter 16. A first local oscillator 14 is connected to mixer 12.

A modulator 17 comprises a mixer 18, connected to filter 16 in encoder 9, an amplifier 20 connected between mixer 18 and a filter 24, and a coupler 26 connected to filter 24. A carrier suppression loop auto-balance apparatus 28 is connected to coupler 26 through a node 280, to first oscillator 14 through a node 284, and to a summing device 22 through a node 302. A code generator 32 is connected to summing device 22. Summing device 22 is further connected to mixer 18 in modulator 17.

An up-converter 33 comprises a mixer 34 connected to coupler 26 and connected to an FM modulator 36, which is in turn connected to a second local oscillator 38. Mixer 34 is further connected to a filter 42 which is in turn connected to an amplifier 44, all within up-converter 33. A noise source 40 is connected to FM modulator 36. Lastly, an antenna 46 is connected to amplifier 44.

Filters, mixers, code generators, summing devices, FM modulators, couplers, amplifiers and antennas are well known and readily available to those skilled in the art and will not be discussed further. First local oscillator 14 and second local oscillator 38 may both be derived from a common oscillator by means of frequency dividing networks, phase-locked loops and related apparatus well known to those skilled in the art. Encoding apparatus 10 may be of the sort disclosed in a co-pending U.S. patent application entitled "Data Encoding and Decoding Communication System For Three-Frequency FSK Modulation and Method Therefor", Ser. No. 344,149, filed by E. J. Groth, Jr. and assigned to the assignee of the present invention. Noise source 40 may comprise a simple noise source such as a diode coupled to a low pass filter and may be introduced into a phase-locked loop between a loop filter and a voltage-controlled oscillator. Finally, a carrier suppression loop auto-balance suitable for use in the transmitter of FIG. 1 is described below.

In the operation of the transmitter of FIG. 1, a carrier signal is modulated by data in encoding apparatus 10, up-converted by first oscillator 14 in conjunction with mixer 12, bi-phase modulated in modulator 17, up-converted in up-converter 33 and then radiated into space through antenna 46. The bi-phase modulation that occurs in modulator 17 is provided by code generator 32, the dc offset of which is adjusted by auto-balance apparatus 28 through summing device 22 by balancing mixer 18 in order to minimize a residual carrier line. In the up-conversion process, a wide-bandwidth bi-phase modulated output of structure 17 is spread over a slightly wider bandwidth by mixing with a signal smeared by noise source 40 in order to further suppress residual lines.

In the following discussion, frequencies and bandwidths are provided for the purpose of facilitating the description of the present invention. Although these frequencies and bandwidths are illustrative of theoretical functions of components within structures according to the present invention, it is not intended that the present invention be limited to these frequencies and bandwidths.

In the operation of the embodiment of FIG. 1, a data-encoded carrier signal, which may be at a frequency of 50 MHz, is up-converted to 2450 MHz in mixer 12 by a signal from local oscillator 14, which may be at 2400 MHz. An output signal from mixer 12 is filtered in structure 16, a bandpass filter having a passband of about 40 MHz around a center frequency of 2450 MHz, in order to remove from the modulated carrier difference frequencies but not desired summation frequencies which occur as a result of mixing.

An output signal from filter 16 is modulated in mixer 18 within modulator 17 by the output signal from summing device 22. The output signal from device 22 is obtained by summing the output signal from code generator 32, which may be at 300 MHz, with the output signal from auto-balance 28. The output signal from code generator 32 may be expressed as a pseudo-random binary coded signal at either a voltage $+V$ or a voltage $-V$. The output signal from auto-balance 28 may be expressed as a linear increment, $+\Delta V$ or as a linear decrement, $-\Delta V$. Therefore, the output signal from summing device 22 may be expressed as $\pm V \pm \Delta V$. The output signal from mixer 18 is amplified in structure 20 and filtered in structure 24, which may be a bandpass filter having the passband of about 600 MHz around the center frequency of 2450 MHz, in order to remove undesired frequencies. The output signal from filter 24 is passed by way of coupler 26 to auto-balance 28.

In auto-balance 28, a narrow band frequency sample around the carrier frequency is obtained from the spectrum of the signal from modulator 17. The narrow band sample is multiplied by a dithered signal, which alternately has a $+$ or $-$ voltage level, and is integrated and summed with the dithered signal before being applied to summing device 22 through node 302. By summing the output signal from auto-balance 28 with the output signal from code generator 32, the dc offset of bi-phase modulation or spreading in mixer 18 is adjusted to minimize the residual carrier line.

An output signal from local oscillator 38, which may have a frequency of about 8 GHz, is frequency modulated in element 36 as controlled by the level of noise source 40. By mixing the output signal from modulator 17, which is of the form sin x/x, with the output signal from modulator 36 in mixer 34, the remaining residual lines are virtually obliterated. The output signal from mixer 34 is then filtered in element 42 to suppress the undesired difference frequency from mixer 34, amplified in element 44 and radiated through antenna 46.

Turning now to FIG. 2 in which auto-balance 28 is illustrated by a block diagram, a first bandpass filter 281 has an input connected to node 280 and an output connected to a input of a first amplifier 282. An output of amplifier 282 is connected to a first input of a mixer 283, a second input of which is connected to node 284. An output of mixer 283 is connected to an input of a second bandpass filter 286, an output of which is connected to an input of a second amplifier 288. An output of amplifier 288 is connected to a first input of a mixer 290 while a second input of mixer 290 is connected to an output of a crystal oscillator 291. An output of mixer 290 is connected to an input of a crystal filter 292.

An output of filter 292 is connected to an input of a detector 297 while an output of detector 297 is connected to a first input of a mixer 298. A second input of mixer 298 is connected to an output of a dither oscillator 299. An input of an integrator 300 is connected to an output of mixer 298 while an output of integrator 300 is connected to a first input of a summing device 301. A second input of summing device 301 is connected to the output of dither oscillator 299 while an output of summing device 301 is connected to node 302.

Amplifiers, mixers, integrators, summing devices, bandpass filters, phase detectors, gates, oscillators, crystal filters, and crystal oscillators are all readily available to those skilled in the art and will not be discussed further. In the discussion that follows, although certain theoretical values or frequencies are supplied for components for the purpose of illustration, it is not intended that these structures be limited to those frequencies.

An output signal from modulator 17 is applied through node 280 to bandpass filter 281, which may have a passband bandwidth of about 40 MHz and a center frequency of about 2450 MHz. An output signal from filter 281 is mixed with the signal from first local oscillator 14, at 2400 MHz, in mixer 283 after being passed through node 284. An output signal from mixer 283 is filtered in structure 286, which may have a passband bandwidth of about 2 MHz around a center frequency of about 50 MHz. As is clear to one skilled in the art, if a practical filter could be implemented at $F_0$, the frequency at node 280, elements 281, 282, and 283 may be eliminated. In either case the bandpass filter 286 selects the difference frequency, which may be at about 50 MHz, from the output signal of mixer 286.

An output signal from bandpass filter 286 is amplified in element 288 and mixed in element 290 with an output signal from crystal oscillator 291, which may operate at a frequency of 40 MHz. An output signal from mixer 290 is filtered in element 292, which may be a crystal bandpass filter having a passband bandwidth of about 100 Hz around a center frequency of 10 MHz.

An output signal from filter 292 is detected in detector 297 and is multipled in mixer 298 by an output signal from dither oscillator 299, which may be at a frequency of about 10 Hz. The signal resulting from the multiplication in mixer 298 in integrated in integrator 300 and then summed in summing device 301 with the output signal from dither oscillator 299 before being applied to summing device 22 through node 302.

Therefore, a narrow band sample of the signal spectrum from modulator 17 is selected by filtering and down-conversion in elements 281, 282, 283, 286, 288, 290, 291 and 292 and by the detecting action of element 297. The selected sample is detected by element 297 to provide a signal for mixing in element 298 at the frequency of dither oscillator 299. A dithered signal passed through node 302 is incremented or decremented according to the sum of the output signal from oscillator 299 and the integrated product of the output signal of oscillator 299 and the detected dithered carrier.

Figure 3A:
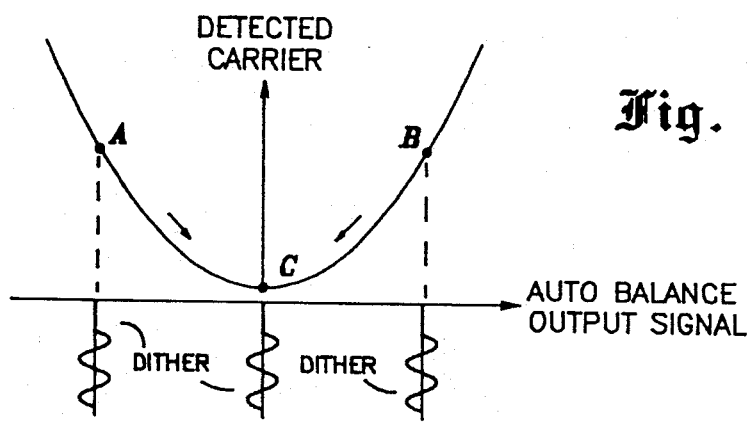
FIG. 3A is a plot of a level of a detected carrier signal versus the level of the auto-balance output signal under various conditions.

In a graph of the level of the detected carrier versus the level of the auto-balance output signal through node 302, as shown in FIG. 3A, it can be seen that the level of the residual line due to the carrier is least at the level of point C, which may be considered to be the minimum point of a parabola. At any other point on the parabola, for example at point A, corresponding to a low level of auto-balance output signal, and point B, corresponding to a high level of auto-balance output signal, the level of the residual line due to the carrier is higher. The way in which the present invention makes use of this fact is illustrated in FIG. 3B.

In FIG. 3B are shown waveforms which represent the detected dither, that is the level of the output signal from detector 297, for each of points A, B and C of FIG. 3A. Also shown is the level of the signal, D, at the output of oscillator 299. As is readily apparent from a comparison of these waveforms, because waveform A is in phase with waveform D, multiplication of the level at any point of waveform A by the level of any corresponding point of waveform D results in a positive output from mixer 298. The result of integrating such a positive output signal in element 300 and summing such an integrated signal in element 301 with waveform D would result in a gradually increasing level of the auto-balance output signal through node 302. On the other hand, because waveform B is 180° out of phase with waveform D, multiplication of any point on waveform B with the corresponding point on waveform D results in a negative level output signal from mixer 298 which when integrated and summed with waveform D causes a gradually decreasing level of output signal to pass through node 302. Unlike the result for waveform A or the result for waveform B, because waveform C is alternately in and out of phase with waveform D, multiplying any point on waveform C by the corresponding point on waveform D results in alternately positive and negative output from mixer 298 so that the result of integration in element 300 is that the auto-balance output signal remains constant.

Thus, the process according to the present invention involves monitoring the spread signal in the transmitter before final up-conversion with what amounts to a spectrum analyzer receiver and involves using the output of the pseudo-receiver to null the carrier with automatic balance adjustments. Before final up-conversion, the transmitter signal is down-converted coherently, using the oscillator signals present in the transmitter to recover the suppressed carrier. The resulting signal is passed through a narrow band crystal filter to recover the center suppressed carrier only. The balance of the spectrum-spreading bi-phase modulator is dithered at a rate well within the bandwidth of the crystal filter but at least an order of magnitude higher than the bandwidth of the balance control loop. This dither rate serves as a carrier for the balance control loop. The amplitude of the signal from the crystal filter is then phase detected using the dither signal as a reference. The output of the phase detector is a sign-sensitive error signal which, after appropriate low pass filtering, is used to close the loop and drive the average balance of the bi-phase modulator to null the residual carrier and hold it at an optimum commensurate with the crystal filter bandwidth.

Although the carrier suppression loop auto-balance has the effect of suppressing the carrier so that any analysis bandwidth of about the bandwidth of the crystal filter or wider will not be able to detect the carrier above the spread spectrum signal, a narrower analysis bandwidth may successfully detect the carrier. Such detection is prevented by the smearing of the whole spectrum including any other residual lines over a bandwidth which makes line detection impossible in just such a narrower analyzer bandwidth. A typical bandwidth for such smearing is about 10 kHz. The bandwidth must be small compared with the lowest system data rate but wide when compared with the bandwidth of the crystal filter.

It is clear to one skilled in the art that the auto-balance and the smearing operation complement each other. The auto-balance arrangement insures that balance is good enough that line detection cannot be obtained in bandwidths greater than the bandwidth of the crystal filter while the smearing operation destroys line detection in bandwidths less than the smear bandwidth of, perhaps, 10 kHz. Consequently, the residual spectral lines are theoretically undetectable.

While the present invention has been described in terms of a preferred embodiment, further modifications and improvements will occur to those skilled in the art. For example, although smearing is incompatible with phase shift keyed (PSK) systems because phase information is thereby destroyed, the carrier suppression auto-balance loop of the present invention is compatible with PSK systems and it is intended that a PSK system employing the auto-balance loop be understood to be within the scope of the invention as described.

I desire it to be understood, therefore, that the present invention is not limited to the particular form shown and that I intend in the appended claims to cover all such equivalent variations which come within the scope of the invention as described.

I claim:

1. An auto-balance apparatus for suppression of a residual carrier line in a signal spectrum around a carrier frequency comprising:
   means for obtaining a narrow-band frequency sample of the signal spectrum around the carrier frequency;
   a source of a dither signal;
   a multiplier coupled to said means for obtaining a narrow-band frequency sample and coupled to said source of a dither signal;
   an integrator coupled to said multiplier; and
   a summing device coupled to said source of a dither signal and coupled to said integrator.

2. The auto-balance apparatus according to claim 1 wherein said means for obtaining a narrow-band frequency sample comprises:
   a detector coupled to said multiplier; and
   means for filtering the signal spectrum coupled to said detector.

3. The auto-balance apparatus according to claim 2 wherein said means for filtering comprises a plurality of bandpass filters coupled in descending order of passband bandwidth among said plurality of bandpass filters with the filter having the narrowest passband bandwidth being coupled to said detector.

4. The auto-balance apparatus according to claims 2 or 3 wherein said means for obtaining a narrow band frequency sample further comprises a down-converter coupled to said detector.

5. The auto-balance apparatus according to claim 4 wherein said down-converter comprises:
   a crystal filter coupled to said detector;
   a mixer coupled to said crystal filter; and
   a crystal oscillator coupled to said mixer.

6. A method for providing an auto-balance for suppression of a residual carrier line in a mixer providing a spread spectrum signal around the frequency of the carrier, comprising the steps of:
   obtaining a narrow-band frequency sample of the signal spectrum around the frequency of the carrier;
   multiplying said narrow-band frequency sample by a dithered signal;
   integrating a result of said multiplying step;
   summing a result of said integrating step with said dithered signal; and
   varying a dc offset of the mixer using a result of said summing step in order to minimize the carrier frequency component in the spread spectrum signal.

7. A method for suppressing residual lines, including a carrier residual line, in a mixer providing a spread spectrum signal around the frequency of the carrier, comprising the steps of:
   providing an auto-balance for the mixer providing the spread spectrum signal so that the level of the carrier residual line in the spread spectrum signal is minimal; and
   smearing the spread spectrum signal after said providing step to obliterate any residual lines remaining after the providing step.

8. The method for suppressing residual lines according to claim 7 wherein said providing step comprises the steps of:
   obtaining a narrow band frequency sample of the transmitted spectrum around the frequency of the carrier;
   multiplying said narrow band frequency sample by a dithered signal;
   integrating a result of said multiplying step;
   summing a result of said integrating step with said dithered signal; and
   varying a dc offset of the mixer using a result of said summing step in order to minimize the carrier frequency component in the spread spectrum signal.

9. A transmitter capable of suppressing residual lines in a signal spectrum, comprising
   an encoder;
   a modulator coupled to said encoder;
   an auto-balance apparatus coupled to said modulator;
   a code generator;
   a summing device coupled to said auto-balance apparatus, coupled to said code generator and coupled to said modulator;
   an up-converter coupled to said modulator;
   a noise source coupled to said up-converter; and
   a antenna coupled to said up-converter.

10. The transmitter according to claim 9 wherein said auto-balance apparatus comprises:
    means for obtaining a narrow-band frequency sample of the spread signal spectrum coupled to said modulator;
    a source of a dither signal;
    a multiplier coupled to said means for obtaining a narrow-band frequency sample and coupled to said source of a dither signal;
    an integrator coupled to said multiplier; and
    a summing device coupled to said source of a dither signal and coupled to said integrator.

11. The transmitter according to claim 10 wherein said means for obtaining a narrow-band frequency sample comprises:
    a detector coupled to said multiplier; and
    means for filtering the signal spectrum coupled to said detector.

12. The transmitter according to claim 11 wherein said means for filtering comprises a plurality of bandpass filters coupled in descending order of passband bandwidth with the filter having the narrowest passband bandwidth among said plurality of bandpass filters being coupled to said detector.

13. The transmitter according to claims 11 or 12 wherein said means for obtaining a narrow-band frequency sample comprises a down-converter coupled to said means for filtering.

14. The transmitter according to claim 13 wherein said down-converter comprises:
    a crystal filter coupled to said detector;
    a mixer coupled to said crystal filter; and
    a crystal oscillator coupled to said mixer.

* * * * *